United States Patent
Labonte et al.

(10) Patent No.: US 8,479,204 B1
(45) Date of Patent: Jul. 2, 2013

(54) TECHNIQUES FOR DETERMINING TRANSACTION PROGRESS

(75) Inventors: Kevin S. Labonte, North Grafton, MA (US); Deene A. Dafoe, Northborough, MA (US); Xuan Tang, Hopkinton, MA (US); Utkarsh Vipul, Mansfield, MA (US); Tianming Zhang, Hopkinton, MA (US); Shailesh Surendra Padwal, Marlborough, MA (US); Muhamad Djunaedi, Northborough, MA (US)

(73) Assignee: EMC Corporation, Hopkinton, MA (US)

( * ) Notice: Subject to any disclaimer, the term of this patent is extended or adjusted under 35 U.S.C. 154(b) by 300 days.

(21) Appl. No.: 12/924,568

(22) Filed: Sep. 30, 2010

(51) Int. Cl.
*G06F 9/46* (2006.01)
(52) U.S. Cl.
USPC .......................................... 718/101; 718/100
(58) Field of Classification Search
None
See application file for complete search history.

(56) References Cited

U.S. PATENT DOCUMENTS 5,574,902 A * 11/1996 Josten et al. ........................ 1/1
8,219,997 B2 * 7/2012 Shimizu et al. ............... 718/104

* cited by examiner

*Primary Examiner* — Kenneth Tang
(74) *Attorney, Agent, or Firm* — Muirhead and Saturnelli, LLC

(57) ABSTRACT

Described are techniques for determining progress of a transaction. A plurality of weights are received. Each of the weights indicates a weight for a different one of a plurality of tasks performed to complete processing for the transaction. At a point in time, a plurality of first metrics for the plurality of tasks are determined. Each of the plurality of first metrics corresponds to a first of the plurality of tasks and indicates an amount of the first task completed at the point in time. A second metric is determined indicating an amount of processing completed for the transaction at the point in time. The second metric is determined in accordance with the plurality of first metrics and the plurality of weights.

18 Claims, 4 Drawing Sheets

TECHNIQUES FOR DETERMINING TRANSACTION PROGRESS

BACKGROUND

1. Technical Field

This application generally relates to computer systems, and more particularly to determining progress of a transaction.

2. Description of Related Art

In connection with a computer system, a user may make a request to perform a particular operation such as using a user interface (UI). While processing is performed to complete the requested operation, information may be reported to the user using the UI regarding the status or progress of the requested operation. For example, when performing an installation, information may be displayed using the UI indicating an amount of the installation completed at a point in time.

It may be desirable to utilize a technique which provides for accurately determining the progress of the requested operation, or step thereof, at a point in time in order to provide the user with information regarding such progress.

SUMMARY OF THE INVENTION

In accordance with one aspect of the invention is a method for determining progress of a transaction comprising: receiving a plurality of weights, each of said plurality of weights indicating a weight for a different one of a plurality of tasks performed to complete processing for said transaction; determining, at a point in time, a plurality of first metrics for said plurality of tasks, each of said plurality of first metrics corresponding to a first of said plurality of tasks and indicating an amount of said first task completed at said point in time; and determining a second metric indicating an amount of processing completed for said transaction at said point in time, wherein said second metric is determined in accordance with said plurality of first metrics and said plurality of weights. Each of said plurality of weights may be an integer and each of said plurality of first metrics may indicate a percentage. The step of determining said second metric may include multiplying each of said plurality of first metrics for each of said plurality tasks by one of said plurality of weights corresponding to said each task. Each of the plurality of tasks may determine a corresponding one of said plurality of first metrics representing progress of said each task. Each task may use one or more other metrics to perform self monitoring of its progress. Each weight associated with one of said plurality of tasks may indicate a number of units said one task contributes to progress of said transaction. Each weight associated with one of said plurality of tasks may indicate an amount of time to complete said one task relative to an amount of time to complete said transaction. The transaction may includes a first task to destage a cache. The first task may monitor an amount of said cache destaged in connection with determining one of said plurality of first metrics representing an amount of said first task completed at said point in time. The first task may determine a first number of entries in said cache to be destaged at a start of said first task and a second number of entries in said cache destaged at said point in time. The transaction may correspond to a root node in a tree at a first level and each of said plurality of tasks may correspond to a child node of said root node at a second level. Each of the plurality of tasks may include a plurality of other tasks. Each task may have a first corresponding node in the tree. Each of the plurality of other tasks may be represented by a node in the tree which is a descendant node of said first node. The transaction may determine the second metric by requesting each of said plurality of first metrics from each of said plurality of tasks. Each of the plurality of tasks having a first node in the tree may determine one of said plurality of first metrics indicating progress of said each task by requesting progress information from any tasks having corresponding nodes in said tree which are descendant nodes of said first node and aggregating said progress information.

In accordance with another aspect of the invention is a method for determining progress of a transaction comprising: representing said transaction including a plurality of tasks as a tree, wherein said tree includes a plurality of levels with a root node corresponding to the transaction at a first level and each of said plurality of tasks having a node in the tree at a level other than said first level which is a descendant of said root node; receiving a plurality of weights, each of said plurality of weights being associated with a node in the tree, said weight representing an amount of time to complete a portion of processing represented by said node; receiving a request to determine progress of said transaction, said progress representing an amount of said transaction that has completed; and determining said progress in accordance with said tree and said plurality of weights. Each of the plurality of tasks represented by a first node in the tree may determine its progress by aggregating progress information from any descendant nodes of said first node. The first node may report its progress to another task corresponding to its parent node.

In accordance with another aspect of the invention is a computer readable medium comprising code stored thereon for determining progress of a transaction comprising, the computer readable medium comprising code for: receiving a plurality of weights, each of said plurality of weights indicating a weight for a different one of a plurality of tasks performed to complete processing for said transaction; determining, at a point in time, a plurality of first metrics for said plurality of tasks, each of said plurality of first metrics corresponding to a first of said plurality of tasks and indicating an amount of said first task completed at said point in time; and determining a second metric indicating an amount of processing completed for said transaction at said point in time, wherein said second metric is determined in accordance with said plurality of first metrics and said plurality of weights. Each of said plurality of weights may be an integer. Each of the plurality of first metrics may indicate a percentage. Determining the second metric may include multiplying each of said plurality of first metrics for each of said plurality tasks by one of said plurality of weights corresponding to said each task. Each of the plurality of tasks may determine a corresponding one of said plurality of first metrics representing progress of said each task. Each weight associated with one of said plurality of tasks may indicate an amount of time to complete said one task relative to an amount of time to complete said transaction.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
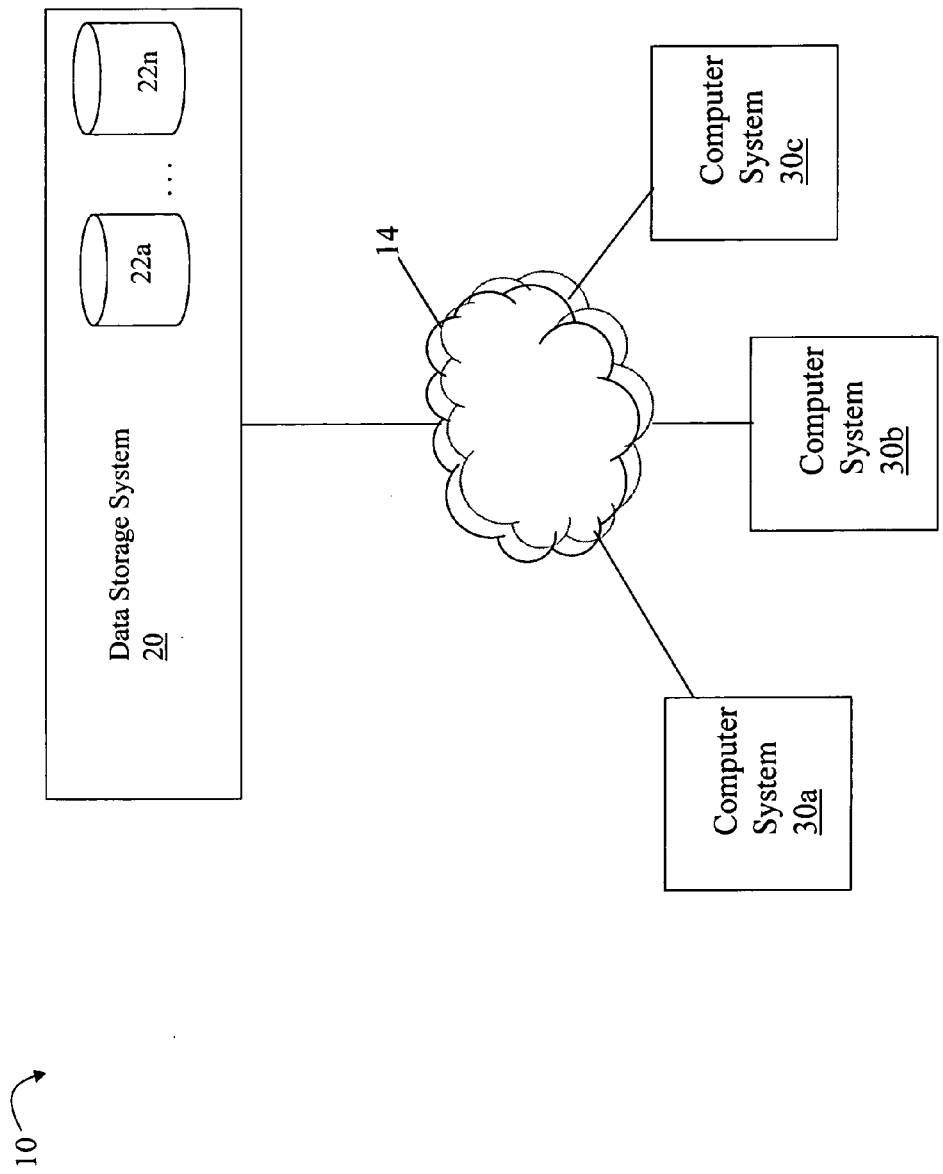
FIG. 1 is an example of an embodiment of a system that may utilize the techniques described herein.

Referring to FIG. 1, shown is an example of an embodiment of a computing environment that may be used in performing the techniques described herein. The computing environment illustrated in FIG. 1 is only one example of a suitable computing environment and is not intended to suggest any limitation as to the scope of use or functionality of the techniques described herein. Those skilled in the art will appreciate that the techniques described herein may be suitable for use with other general purpose and specialized purpose computing environments and configurations. Examples of well known computing systems, environments, and/or configurations include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The techniques set forth herein may be described in the general context of computer-executable instructions, such as program modules, executed by one or more computers or other devices. Generally, program modules include routines, programs, objects, components, data structures, and the like, that perform particular tasks or implement particular abstract data types. Typically the functionality of the program modules may be combined or distributed as desired in various embodiments.

Included in FIG. 1 are computer systems 30a-30c, data storage system 20, and a network 14. Each of the computers 30a-30c may be a standard, commercially-available computer or a special-purpose computer that may be used to execute one or more program modules. Described in more detail elsewhere herein are program modules that may be executed by computers 30a-30c in connection with facilitating filtered event notification. The computers 30a-30c may operate in a networked environment and communicate with other computers and components not shown in FIG. 1. The data storage system 20 may be a data storage array having a plurality of data storage devices 22 such as, for example disk drives, flash drives, and the like. The computers 30a-30c may communicate over network 14 to access data stored on devices of the data storage system 20. The data storage system 20 may be, for example, a data storage array of a vendor such as EMC Corporation of Hopkinton, Mass.

It will be appreciated by those skilled in the art that although components of the system of FIG. 1 are shown in the example as communicating in a networked environment, the components may communicate with each other and/or other components utilizing different communication mediums. For example, the components of FIG. 1 may communicate with each other and/or one or more components utilizing a network connection, and/or other type of link known in the art including, but not limited to, the Internet, an intranet, or other wireless and/or hardwired connection(s).

Although not illustrated in FIG. 1, each of the computers 30a-30c may include one or more processing units, memory, a network interface unit, storage, and the like. Depending on the configuration and type of computer, the memory thereof may be volatile (such as RAM), non-volatile (such as ROM, flash memory, etc.) or some combination of the two. The storage may include removable and/or non-removable storage for use with computer system including, but not limited to, USB devices, magnetic or optical disks, or tape. Such storage devices have associated computer-readable media that may be utilized by the computer and may include, for example, a hard disk or CD-ROM drive, that can be accessed by the computer. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by the computer. Each of the computers may also contain communications connection(s) to facilitate communication with other devices and components such as, by way of example, input devices and output devices. Input devices may include, for example, a keyboard, mouse, pen, voice input device, touch input device, etc. Output device(s) may include, for example, a display, speakers, printer, and the like. These and other devices are well known in the art.

A computer system, such as 30a, may have an application with a user interface (UI) executing thereon. The UI may be a graphical user interface (GUI) which provides for display of one or more well known UI elements such as, for example, menus, tables, message boxes, radio buttons, and the like. Described in following paragraphs are techniques that may be used in connection with providing a user with information regarding the progress at various points in time with respect to a requested operation. For example, the user may make a menu selection to perform a requested operation. In response, the application's UI may provide a message box with information indicating the progress over time of the requested operation. The application may be software executing on computer 30a and may require interactions with the data storage system 20, one or more other computers connected through the network to the computer 30a, and the like. The requested operation may also be performed while the computer 30a is running standalone not connected to the network or other components.

While processing is performed to complete the requested operation, as noted above, information may be reported to the user using the UI regarding the status or progress of the requested operation processing. For example, when performing an installation, information may be displayed using the UI indicating an amount of the installation, completed at a point in time. In some implementations which do not utilize techniques described herein, progress reported for a requested operation at a point in time may be determined based solely on how many steps of the requested operation are completed at a point in time with an assumption that each step takes approximately the same amount of time to complete. This can lead to inaccurate reporting regarding progress since each step may not take the same amount of time. Furthermore, such systems may also update progress of the requested operation only when each discrete step completes. In other words, such implementations may have progress reporting reflect as completed only those steps which are entirely completed rather than also report on the a currently executing step.

What will be described in following paragraphs are techniques that may be used to determine the progress of a requested operation in order to accurately report on such progress, for example, as may be reported to a user through the UI. In connection with following paragraphs, a transaction may correspond to the requested operation. Each transaction may further include one or more steps or tasks. As an example, a transaction may be a complex operation and, in order to complete the complex operation, the transaction may be partitioned into multiple steps or tasks. Although the following exemplary embodiment may be used in connection with a UI and reporting information regarding transaction completion to a user, it will be appreciated by those of ordinary skill in the art that the techniques herein are more generally applicable for use in connection with any type of application and system where it is desirable to determine progress regarding a transaction.

In connection with techniques herein, each task may be associated with a weight providing an indication of an amount of time it takes to complete that particular task relative to the total amount of time for completing the transaction. Additionally, each task may also report its individual or local progress with respect to completing its own processing (e.g, each task may be self monitoring and report on its progress). For example, consider a transaction which is partitioned into three tasks. Each task may be assigned a weight reflecting the amount of time it takes to complete that task relative to the total transaction. To further illustrate for a single transaction comprising three tasks, a first task, task 1, may be assigned a weight of 10, a second task, task 2, may be assigned a weight of 6, and a third task, task 3, may be assigned a weight of 4. The total or aggregated weight for the transaction is 20 (e.g., sum of the task weights). Considering each task separately with respect to the total transaction, when task 1 has completed, 50% (e.g., 10/20 based on the weights) of the overall transaction has been completed; when task 2 has completed, 30% (e.g., 6/20 based on the weights) of the overall transaction has completed; and when task 3 has completed, 20% (e.g., 4/20 based on the weights) of the total transaction has completed.

In addition to assigning weights to the tasks based on an estimated or expected amount of time to complete relative to the other tasks, an embodiment in accordance with techniques herein may have each task report on its own individual or local progress. In this way, an embodiment in accordance with techniques herein may report progress at a finer granularity per task by tracking and reporting on the progress with respect to each ongoing task rather than just have the reported progress reflect whether the entire task has completed or not. In an embodiment which performs such steps in a sequential and consecutive manner so that the task ordering is task 1, task 2 and task 3 where processing for a subsequent task is not commenced until the prior task as completed, when task 1 has completed, 50% (e.g., 10/20 based on the weights) of the overall transaction has been completed; when task 2 has completed, 80% (e.g., 10+6/20 based on the weights) of the overall transaction has completed; and when task 3 has completed, 100% (e.g., 10+6+4/20 based on the weights) of the total transaction has completed. Progress may be reported regarding the total transaction based on what tasks have completed and also an indication as to the progress of the task which is currently executing and has not yet completed. For example, if task 1 has completed (e.g., 50% of total transaction, 10/20 weights) and task 2 is executing and 50% complete (e.g., 3/6 based on the weight associated with task 2 contributing to 15% of the total transaction progress), the total transaction progress may be reported as 65% completed (e.g., 50% of transaction progress due to completion of task 1+15% of transaction progress due to current progress of task 2).

It should be noted that the techniques herein may be used in an embodiment which performs processing for the tasks in a serial and consecutive manner as just described as well as in a parallel fashion where processing of any two or more of the tasks may be in progress at a given time. In this latter case (e.g. wherein processing of any two or more tasks may overlap or be ongoing at a point in time), it will be appreciated by those of ordinary skill in the art that the progress for the transaction is based on the sum of the progress of each individual task at the point in time.

Figure 2:
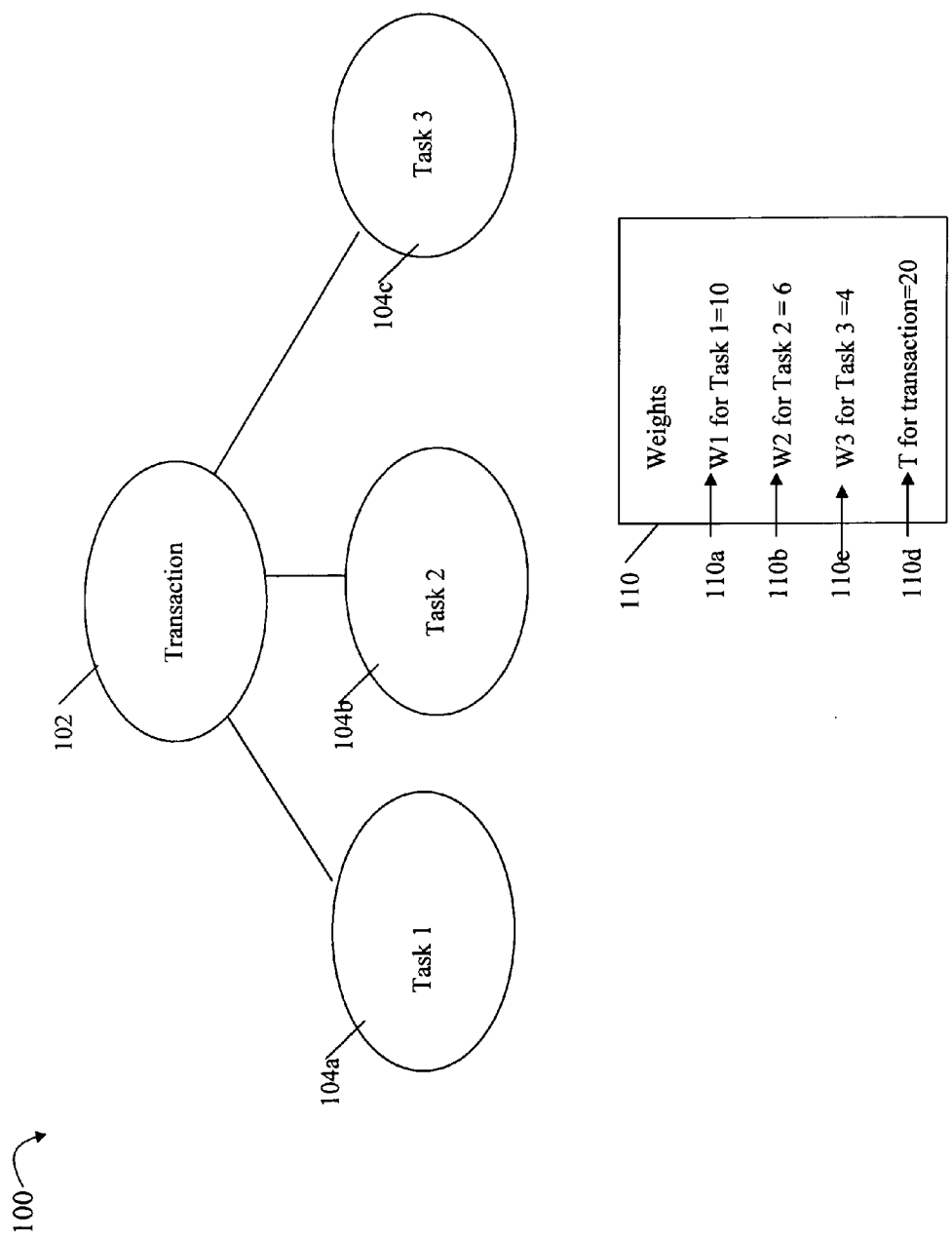
FIGS. 2 and 3 are examples illustrating use of the techniques herein.

Referring to FIG. 2, shown is an illustration representing the foregoing example in accordance with techniques herein. The example 100 represents the transaction 102 including tasks 1-3 denoted, respectively, as elements 104*a*-104*c*. The example 100 represents the transaction and its tasks in a tree or, more generally, a hierarchical arrangement with the transaction as the root node 102 and each of the tasks included in the transaction represented as one of the child nodes 104*a*-140*c* of the root node 102. Table 110 illustrates the weights that may be associated with the tasks and transaction. Element 110*a* represents the weight W1 for task 1. Element 110*b* represents the weight W2 for task 2. Element 110*c* represents the weight W3 for task 3. Element 110*d* represents the total transaction weight T which is the sum of all task weights. The root node 102 may be characterized as being at level 1 of the tree or hierarchy and nodes 104*a*-*c*, at level 2. Nodes 104*a*-*c* may also be referred to as leaf nodes because they do not have any child nodes. Each node may be associated with a portion of the processing performed in order to complete the transaction. Node 102 may be associated with all processing for the transaction and each of the nodes 104*a*-*c* associated with a different portion of the processing associated with node 102. More generally, node 102 may be referred to also as a parent node having child nodes 104*a*-*c*. Nodes 104*a*-*c* may be more generally referred to as descendants of node 102. The processing (e.g., the work to be performed in completing the transaction) that is associated with a parent node may be partitioned among its child nodes, or more generally, its descendant nodes. Each of the weights W1-W3 associated with a corresponding one of the tasks may represent an approximation or estimate of the expected amount of time to complete the corresponding task relative to the total amount of time expected to complete processing for the entire transaction.

The weights associated with the transaction and each task may be predetermined prior to execution of the transaction. The weights may be assigned or selected based on approximate or estimated amounts as determined by developer or other knowledgeable individual about the transaction. For example, an individual may assign a set of weights for the tasks based on the individual's experience and knowledge of the transaction's execution time as may be based on actual observation and measurements obtained during task and transaction execution. Such weights may also be adjusted based on further observation and measurements obtained during task and transaction execution. It should be noted that weights may be determined using other techniques such as simulating transaction execution and others known in the art that may be vary with transaction.

At runtime when performing processing to complete the transaction, each task may correspond to processing performed by a code entity such as a process, thread, routine, and the like. The code entity performing a task may track the progress of processing with respect to that individual task independent of the other tasks. The code entity performing the task may report on its individual progress to another code entity performing processing associated with its parent node in any suitable manner. For example, in one embodiment, a first code entity performing task 1 (e.g. node 104a) may report its progress periodically to a second code entity associated with the parent node. Such reporting may be performed, for example, in response to a request from the second code entity polling periodically, or automatically at predetermined times without requiring a request from the second code entity. More generally, the code entity performing processing associated with a parent node may aggregate progress information reported from its child nodes, and more generally, progress information as reported from its descendant nodes at lower levels in the tree. As such, the example 100 may represent a reporting or communication hierarchy with respect to aggregating progress information for the transaction where each child node (corresponding to a code entity performing processing for a task) reports its progress to its parent node. In connection with paragraphs describing the progress reporting techniques herein, description may be made to internode communication in the tree or other hierarchy such as a child node reporting to its parent node, a parent node requesting progress information from its child and other descendant nodes, and so on. It is understood that such reporting, querying and other communication as characterized between nodes may be performed in connection with executing code entities associated with each such node the performs work or processing steps of the transaction associated with each such node. The rate at which progress information is requested, aggregated and/or reported may vary with the expected transaction time.

FIG. 2 represents a simple example illustrating the use of the techniques herein with a tree having two levels where the transaction 102 may be partitioned a first time into 3 tasks associated with a second level in the tree. Each child node reports its progress to its parent node. As mentioned above, the foregoing techniques may be more generally applied in connection with a tree having more than two levels as will now be described. It may be the case that one of more of the tasks, such as represented by nodes 104a-104c, may be further partitioned into multiple subtasks, or more generally smaller tasks. Each of these subtasks may be further partitioned into one or more other yet smaller tasks, and so on, in a recursive or repetitive manner. Each of the foregoing tasks may have a corresponding node in the tree. Each iteration or level of partitioning may correspond to another level in the tree. In a manner similar to that as described above with FIG. 2 and a two level tree, each child node may report on its progress to its parent node. The parent node may aggregate progress information as reported from its one or more child nodes and, more generally, any of its descendant nodes one or more levels beneath the parent node in the hierarchy. In this way, the reporting hierarchy for progress regarding the transaction may be generalized as follows in a hierarchy have the root node at level 1 and the leaf nodes at level N. Each parent node at a level M (M<N), may aggregate progress information as reported from its descendant nodes at levels greater than M, and the parent node at level M (M>1) may then report on its progress and the progress of its descendant nodes to its parent at level M−1. A parent node at level M may perform any necessary processing to translate progress information as reported by its descendant nodes (e.g., with respect to progress at level M+1) into other progress information with respect to progress of the parent node at level M. This is illustrated in an example below in more detail.

Each node in the tree may report an amount of progress in terms of any suitable unit. For example, each node in the tree may report an amount of progress in terms of a percentage complete with respect to the processing associated only with the node. With reference to FIG. 2 at a point in time, node 102 may request progress information from each of nodes 104a-104c, where any one or more of the nodes 104a-104c may be executing at the point in time. In response, each of the nodes 104a-104c may report on its own individual progress in terms of percentage complete. A percentage reported by one of the nodes, such as 104a, may represent an amount of the task 1 which has been completed at the point in time relative to the total work or processing to be performed in order to complete task 1. For example, assuming processing for nodes 104b and 104c had not commenced and node 104a is executing, node 104a may report that it is 80% complete with respect to processing for completing task 1. The node 102 may then translate this progress information of 80% complete with respect to completing task 1 (e.g., level 2 progress information) into transaction level progress information (e.g., level 1 progress information) to indicate that the transaction is 40% complete (e.g., 80%*W1/T=80%*(10/20)).

Figure 3:
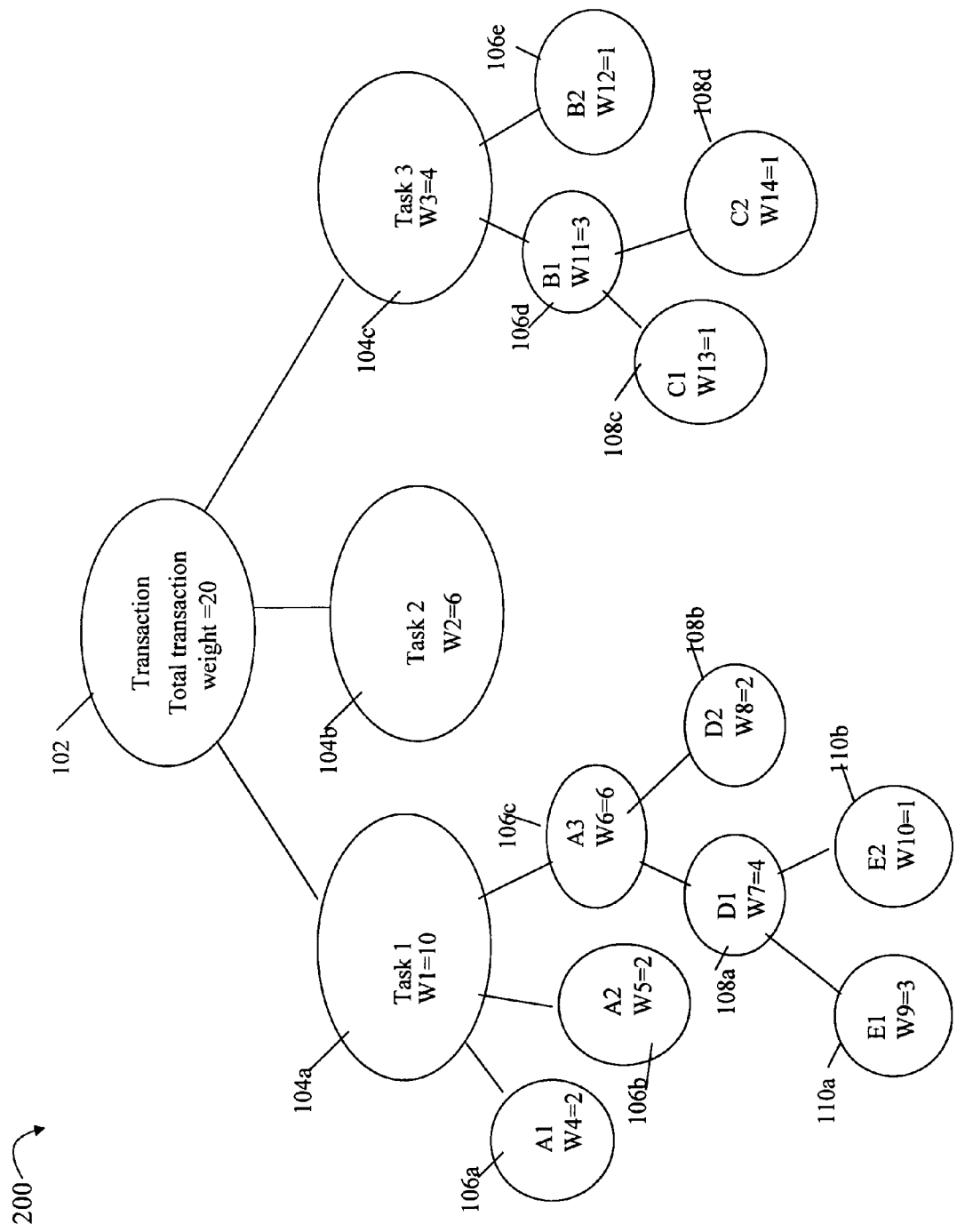

Referring to FIG. 3, shown is an example of a tree having more than two levels as may be used in connection with an embodiment in accordance with the techniques herein. The example 200 illustrates a tree having 5 levels: node 102 at level 1, nodes 104a-c at level 2, node 106a-e at level 3, nodes 108a-d at level 4, and nodes 110a-b at level 5. The example 200 builds on the two level tree of FIG. 2. The root node 102 has the total transaction weight of 20. Each of the other nodes in the example 200 corresponds to a task and has an associated weight, denoted Wn=value, where value indicates the weight expressed as an integer, where the weight for a node is included within the node (e.g., node 106a has a weight of 2).

In furtherance to that described in connection with FIG. 2, processing associated with each of the nodes 104a and 104c may be partitioned into smaller units or tasks. For example, processing associated with node 104a may comprise processing associated with nodes 106a, 106b and 106c. Processing associated with node 106c may be further partitioned to include processing represented by nodes 108a and 108b. Processing associated with node 108a may be further partitioned to include processing represented by nodes 110a and 110b. In a similar manner, processing associated with node 104c may comprise processing associated with nodes 106d and 106e. Processing associated with node 106d may be further partitioned to include processing associated with nodes 108c and 108d.

In accordance with repetitively partitioning tasks 1 and 3, or portions thereof, into smaller tasks, weights may be associated with nodes 104a and 104c, each of the child nodes of 104a and 104c and, more generally, all the descendants of nodes 104a and 104c. In this example, the sum of the weights of the child nodes may be equal to the weight of the parent node. However, the sum of the weights of the child nodes may also be less than the weight associated with the parent node, for example, if the parent node performs any processing that may contribute to the weight associated with the parent node which is not performed by one of its children.

In one embodiment, it should be noted that the weights specified may be relative only among other nodes at the same level so that sum of the weights of child nodes may not be less than or equal to their parent weight as described above. For example, with reference to FIG. 3, tasks C1 and C2 (e.g. nodes 108c and 108d) may each have a weight of 10. When C1 completes, task B1 would be 50% complete providing the same result as when both tasks have a weight=1 as illustrated.

In a manner as described above, consider an example using FIG. 3 where processing for the transaction is performed sequentially in an order corresponding to a depth first traversal of the tree 200 and further traversing each level in a left to right manner. Such a traversal of the tree results in starting at the root, traversing the child nodes from left to right and traversing any descendant nodes of such child nodes in a similar manner exploring all nodes along a path before backtracking or returning to a node. The transaction performs tasks in the order of task 1, 2, and then 3 corresponding to nodes 104*a-c*. Assume that task 1 is in progress and that processing for tasks 2 and 3 has not yet commenced. Node 102 may issue a request to node 104*a* to aggregate and report on its progress. In turn, node 104*a* requests a progress report from its child nodes 106*a*-106*c*. Node 106*c* subsequently requests a progress report from its child nodes 108*a* and 108*b*. Node 108*a* requests a progress report from its child nodes 110*a* and 110*b*. Each of the child nodes may report to its parent node regarding its own individual progress. For example, each child node may report a percentage indicating an amount of completion with respect to processing to be performed by the child node in connection with the transaction. As such, the parent node may translate the percentage reported by the child node into another percentage representative of the parent node's progress using the weights associated with the child and parent nodes. For example, suppose processing for nodes 106*a* and 106*b* has completed so both of these nodes report 100% completion to node 104*a*. Node 106*c* may report that it is 50% complete representing an aggregrate progress of node 106*c* and its descendant nodes 108*a-b* and 110*a-b*. Based on the foregoing, node 104*a* may report its progress to node 102 as 70% complete based on the aggregrate progress of its children. The aggregrate progress of nodes 106*a-c* may be represented as follows using the weights associated with nodes 106*a-c*:

$$= \text{progress } 106a + \text{progress } 106b + \text{progress } 106c$$
$$= (100\% * W4) + (100\% * W5) + (50\% * W6)$$
$$= 2 + 2 + 3$$
$$= 7$$

which may then be translated to a percentage relative to the weight of the node 104*a* (e.g., 7/10=70%). Node 102 may then determine the overall transaction progress to be 35% as follows:

$$= 70\% * W1 \text{ // total transaction weight}$$
$$= (70\% * 10)/20$$
$$= 7/20$$

The overall transaction progress of 35% may be reported to the user via the UI.

In connection with the foregoing, each parent node may know its own weight and the weights of child nodes, if any, in order to determine the completion progress with respect to that portion of the transaction's processing associated with the parent node.

Requests for progress information from the root node at level 1 may be propagated from the root toward the leaf nodes, in a recursive or repetitive manner, from level to level by having each parent node request progress information from its children. Similarly, progress information may be reported up the tree (from the leaf nodes to the root node) by having each child node report its progress to its parent node where the parent node aggregates progress information from all its children and further reports the progress information up the tree one level to its parent node. The foregoing may be repeated until the root node is reached.

Each task corresponding to a node in the tree may determine its progress in any suitable manner as may vary with the particular task such as, for example, using indicators, timers, counters, and the like, as may be available using operating system functionality. For example, a task may determine its progress based, in whole or in part, on elapsed or consumed CPU processing time with respect to an expected or estimated total CPU processing time to complete the task. As another example, consider a transaction including two tasks where a first of the tasks is to destage the cache. The second subsequent task performs other processing subsequent to the first task. As known in the art, data to be written to a physical storage device may be first written to cache and then destaged to the physical storage device at some later point in time by a disk or data storage controller. The first task may monitor its local progress based on how much of the cache has been destaged at different points in time. At the start of the destaging process, the first task may determine the total number of cache entries to be destaged. For example, a flag or other indicator may be associated with each cache entry indicating that the entry needs to be destaged. The first task may count the number of entries having flags or other indicators. The first task may determine its completion progress at a point in time based on the number of cache entries destaged up to the point in time since the task began processing. The first task may report its progress as a percentage of the number of cache entries destaged up to the point in time relative to the total number of cache entries to be destaged as determined at the start of the destaging process. Furthermore, suppose the transaction has a weight of 10, the first task has a weight of 9, and the second task has a weight of 1. The techniques herein may be used to report the progress for the transaction as reported by the first task using the foregoing metric. At a point in time when queried, the first task may report that it is 50% complete based on the observed number of cache entries destaged up to the point in time. As a result, a report may be made to the user via the UI that the transaction is 45% complete (e.g., (50%*9)/10).

Figure 4:
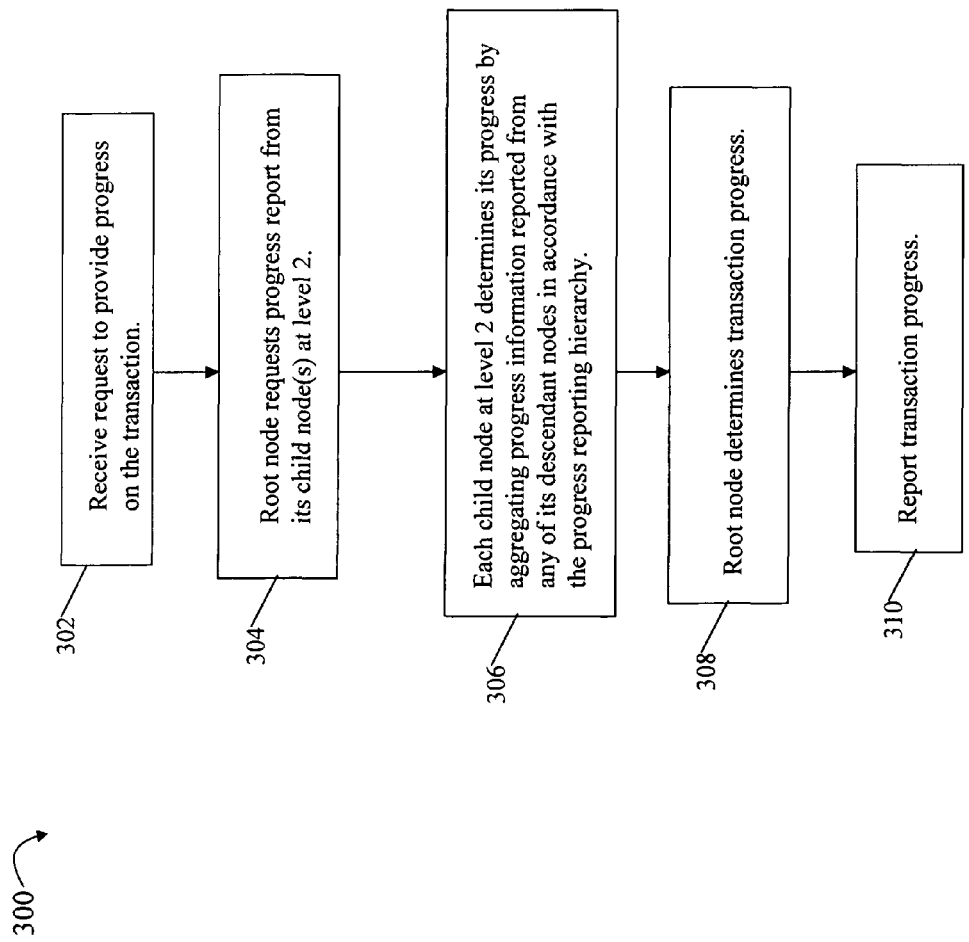
FIG. 4 is a flowchart of processing steps as may be performed in an embodiment in accordance with techniques herein.

Referring to FIG. 4, shown is a flowchart of processing steps as may be performed in an embodiment in accordance with techniques herein. The flowchart 300 summarizes processing as described above. The processing of FIG. 4 assumes that a transaction is represented using a tree as described above for reporting progress having established tasks and associated weights for each task and the transaction. At step 302, a request is received to provide progress information regarding the progress toward completing processing for the transaction. The request received at step 302 may be based on periodic requests to provide updated progress information regarding the task to the UI. The request may be received by code corresponding to the root node. At step 304, the root node requests a progress report from each of its child node(s) at level 2. At step 306, each child node at level 2 determines its progress by aggregating progress information reported from any of its descendant nodes in accordance with the progress reporting hierarchy as described above such as represented using FIGS. 2 and/or 3. As described above, each node at level 2 may issue a request to any of its child nodes to return progress information. The foregoing process of having each parent node request progress information from its child nodes may be performed in a recursive or repetitive manner between levels in the hierarchy. In a similar manner, each node may report progress information to its parent node regarding its progress based on aggregated progress information as reported from its descendant nodes. At step 308, the root node determines the transaction progress and reports the transaction progress in step 310. The transaction's completion progress may be displayed such as using the UI.

An embodiment may implement the techniques herein using code executed by a processor. For example, an embodiment may implement the techniques herein using code which is executed by a processor of a computer system. As will be appreciated by those skilled in the art, the code may be stored on a computer-readable storage medium having any one of a variety of different forms including volatile and nonvolatile, removable and non-removable media implemented in any method or technology for storage of information such as computer readable instructions, data structures, program modules or other data. Computer-readable storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for determining progress of a transaction comprising:
   receiving a plurality of weights, each of said plurality of weights indicating a weight for a different one of a plurality of tasks performed to complete processing for said transaction;
   determining, at a point in time, a plurality of first metrics for said plurality of tasks, each of said plurality of first metrics corresponding to a first of said plurality of tasks and indicating an amount of said first task completed at said point in time; and
   determining a second metric indicating an amount of processing completed for said transaction at said point in time, wherein said second metric is determined in accordance with said plurality of first metrics and said plurality of weights, wherein said determining said second metric includes determining an amount for each of said plurality of tasks by multiplying one of the plurality of first metrics for said each task by one of said plurality of weights corresponding to said each task, wherein at least a first of the plurality of weights associated with one of the plurality of tasks is more than a second of the plurality of weights associated with a different one of the plurality of tasks thereby indicating that the one task is expected to take longer to complete than said different one of the plurality of tasks.

2. The method of claim 1, wherein each of said plurality of weights is an integer and each of said plurality of first metrics indicates a percentage.

3. The method of claim 1, wherein each of said plurality of tasks determines a corresponding one of said plurality of first metrics representing progress of said each task.

4. The method of claim 3, wherein said each task uses one or more other metrics to perform self monitoring of its progress.

5. The method of claim 1, wherein each weight associated with one of said plurality of tasks indicates a number of units said one task contributes to progress of said transaction.

6. The method of claim 1, wherein each weight associated with one of said plurality of tasks indicates an amount of time to complete said one task relative to an amount of time to complete said transaction.

7. The method of claim 1, wherein said transaction includes a first task to destage a cache and said first task monitors an amount of said cache destaged in connection with determining one of said plurality of first metrics representing an amount of said first task completed at said point in time.

8. The method of claim 7, wherein said first task determines a first number of entries in said cache to be destaged at a start of said first task and a second number of entries in said cache destaged at said point in time.

9. The method of claim 1, wherein said transaction corresponds to a root node in a tree at a first level and each of said plurality of tasks corresponds to a child node of said root node at a second level.

10. The method of claim 9, wherein each of said plurality of tasks includes a plurality of other tasks, said each task having a first corresponding node in the tree, each of said plurality of other tasks being represented by a node in the tree which is a descendant node of said first node.

11. The method of claim 10, wherein said transaction determines said second metric by requesting each of said plurality of first metrics from each of said plurality of tasks.

12. The method of claim 11, wherein each of said plurality of tasks having a first node in the tree determines one of said plurality of first metrics indicating progress of said each task by requesting progress information from any tasks having corresponding nodes in said tree which are descendant nodes of said first node and aggregating said progress information.

13. A method for determining progress of a transaction comprising:
   representing said transaction including a plurality of tasks as a tree, wherein said tree includes a plurality of levels with a root node corresponding to the transaction at a first level and each, of said plurality of tasks having a node in the tree at a level other than said first level which is a descendant of said root node;
   receiving a plurality of weights, each of said plurality of weights being associated with a node in the tree, said weight representing an amount of time to complete a portion of processing represented by said node;
   receiving a plurality of first metrics determined at a point in time for said plurality of tasks, each of said plurality of first metrics corresponding to a first of the plurality of tasks indicating an amount of said first task completed at said point in time;
   receiving a request to determine progress of said transaction at said point in time, said progress representing an amount of said transaction that has completed at said point in time; and
   determining said progress in accordance with said tree and said plurality of weights, wherein said determining said progress of said transaction includes determining an amount for each of said plurality of tasks by multiplying one of the plurality of first metrics for said each task by one of said plurality of weights corresponding to said each task, wherein at least a first of the plurality of weights associated with one of the plurality of tasks is more than a second of the plurality of weights associated with a different one of the plurality of tasks thereby indicating that the one task is expected to take longer to complete than said different one of the plurality of tasks.

14. The method of claim 13, wherein each of said plurality of tasks represented by a first node in the tree determines its progress by aggregating progress information from any descendant nodes of said first node, said first node reporting its progress to another task corresponding to its parent node.

15. A non-transitory computer readable medium comprising code stored thereon for determining progress of a transaction comprising, the non-transitory computer readable medium comprising code for:
receiving a plurality of weights; each of said plurality of weights indicating a weight for a different one of a plurality of tasks performed to complete processing for said transaction;
determining, at a point in time, a plurality of first metrics for said plurality of tasks, each of said plurality of first metrics corresponding to a first of said plurality of tasks and indicating an amount of said first task completed at said point in time; and
determining a second metric indicating an amount of processing completed for said transaction at said point in time, wherein said second metric is determined in accordance with said plurality of first metrics and said plurality of weights, wherein said determining said second metric includes determining an amount for each of said plurality of tasks by multiplying one of the plurality of first metrics for said each task by one of said plurality of weights corresponding to said each task, wherein at least a first of the plurality of weights associated with one of the plurality of tasks is more than a second of the plurality of weights associated with a different one of the plurality of tasks thereby indicating that the one task is expected to take longer to complete than said different one of the plurality of tasks.

16. The non-transitory computer readable medium of claim 15, wherein each of said plurality of weights is an integer and each of said plurality of first metrics indicates a percentage.

17. The non-transitory computer readable medium of claim 15, wherein each of said plurality of tasks determines a corresponding one of said plurality of first metrics representing progress of said each task.

18. The non-transitory computer readable medium of claim 15, wherein each weight associated with one of said plurality of tasks indicates an amount of time to complete said one task relative to an amount of time to complete said transaction.

* * * * *